United States Patent [19]
Manabe et al.

[11] Patent Number: 5,708,897
[45] Date of Patent: Jan. 13, 1998

[54] CAMERA HAVING A GRIP

[75] Inventors: Mitsuo Manabe; Yasuhiko Tanaka, both of Saitama, Japan

[73] Assignee: Fuji Photo Optical Co., Ltd., Saitama, Japan

[21] Appl. No.: 788,638

[22] Filed: Jan. 27, 1997

[30] Foreign Application Priority Data

Jan. 30, 1996 [JP] Japan .................................. 8-014250

[51] Int. Cl.$^6$ .................................................. G03B 17/02
[52] U.S. Cl. ............................................................. 396/535
[58] Field of Search ................................. 396/535, 540, 396/541

[56] References Cited

U.S. PATENT DOCUMENTS

| | | | |
|---|---|---|---|
| 4,247,600 | 1/1981 | Adachi | 396/535 |
| 5,353,079 | 10/1994 | Sakai et al. | 396/535 |
| 5,563,674 | 10/1996 | Von Holtz et al. | 396/535 |

*Primary Examiner*—David M. Gray
*Attorney, Agent, or Firm*—Young & Thompson

[57] ABSTRACT

A camera having a front cover made of metal comprises a plastic inner cover to mount the front cover to a main body. The inner cover is provided with a grip portion integrally formed therewith. The grip portion is exposed to the outside and protrudes from the front cover forwardly. Further, a surface of the grip portion is molded with plural ridges for anti-slipping. The grip portion made of plastic has advantages, in comparison with a grip covered with the metal front cover, in prevention of slipping and cost for producing the camera.

8 Claims, 4 Drawing Sheets

CAMERA HAVING A GRIP

BACKGROUND OF THE INVENTION

1. Field of the Invention

The present invention relates to a camera. More particularly, the present invention relates to a camera having a grip improved for reliability of gripping.

2. Description Related to the Prior Art

Compact cameras having a lens shutter have been available in various types such as an easy-photography camera in which focal point is fixed and a high-grade camera in which a focal point is changeable. Especially for the high-grade cameras, there have been attempted to obtain luxury-feeling and originality. For example, the front side of the camera is wholly covered with a metallic cover since such metallic cover can improve the looks of the camera as high-grade camera. The metallic cover is made of an aluminum alloy plate, or a titanium alloy plate by press working (drawing) process in a shape to contour the front surface of the camera body.

The compact cameras have a grip which serves for stable holding of the camera. However, since the metallic cover also covers the grip, there is possibility that the grip easily slips from a hand when a user holds the grip. To prevent this, the conventional cameras are provided with a rubber piece attached to the grip, or ridges or recesses formed on the grip.

However, the additional part, such as the rubber piece, to the grip causes increase of the number of parts and the number of producing steps. Inevitably, the cost for producing the camera is raised. On the other hand, a mold for press-working the ridges or recesses to the metallic plate is relatively expensive. If the mold has a complicated form, the life time of the mold becomes shorter and therefore, needs to be changed at short intervals. Accordingly it is difficult to reduce the cost for producing the camera. Although it is possible to make the surface of the grip rough, this surface finishing also causes increase of the cost.

SUMMARY OF THE INVENTION

In view of the foregoing problems, an object of the present invention is to provide a camera, in which a front cover is made of a metal plate, with a grip improved in reliability of gripping without increasing a cost for producing the grip.

Another object of the present invention is to improve a grip without any increase of the number of parts, and the number of producing steps, of the grip.

In order to achieve the above and other objects and advantages of this invention, a camera having a metallic front cover is provided with an inner cover made of plastic to mount the front cover to a main body and a grip portion integrally formed with the inner cover. When the front cover is fitted on the inner cover, the grip portion is exposed and protrudes from the front cover.

In a preferred embodiment, the inner cover and the grip portion are molded by press working as a one-piece plastic. The inner cover is disposed between the front cover and the main body while the grip portion is not covered with the front cover and protrudes from a side so as to be gripped by user's hand when he takes a posture for photography. Further, a surface of the grip portion is provided with ridges lined up vertically and molded with the grip portion, so as not to slip out of the user's hand accidentally.

In the present invention, the grip portion is made of a plastic with the inner cover so that easiness of slipping the grip portion is decreased. Since the grip portion and the inner cover are a one-piece plastic mold, there is no necessity to provide any separate parts for reliably gripping. Moreover, the grip portion is made of plastic, so it is easy to give a finishing process to the surface. Therefore, the cost for producing the grip is never increased but the reliability for gripping the grip may be maintained without losing the luxury-feeling of the camera due to the front cover.

BRIEF DESCRIPTION OF THE DRAWINGS

The above objects and advantages of the present invention will become more apparent from the following detailed description when read in connection with accompanying drawings, in which.

DETAILED DESCRIPTION OF THE PREFERRED EMBODIMENTS OF THE PRESENT INVENTION

Figure 1:
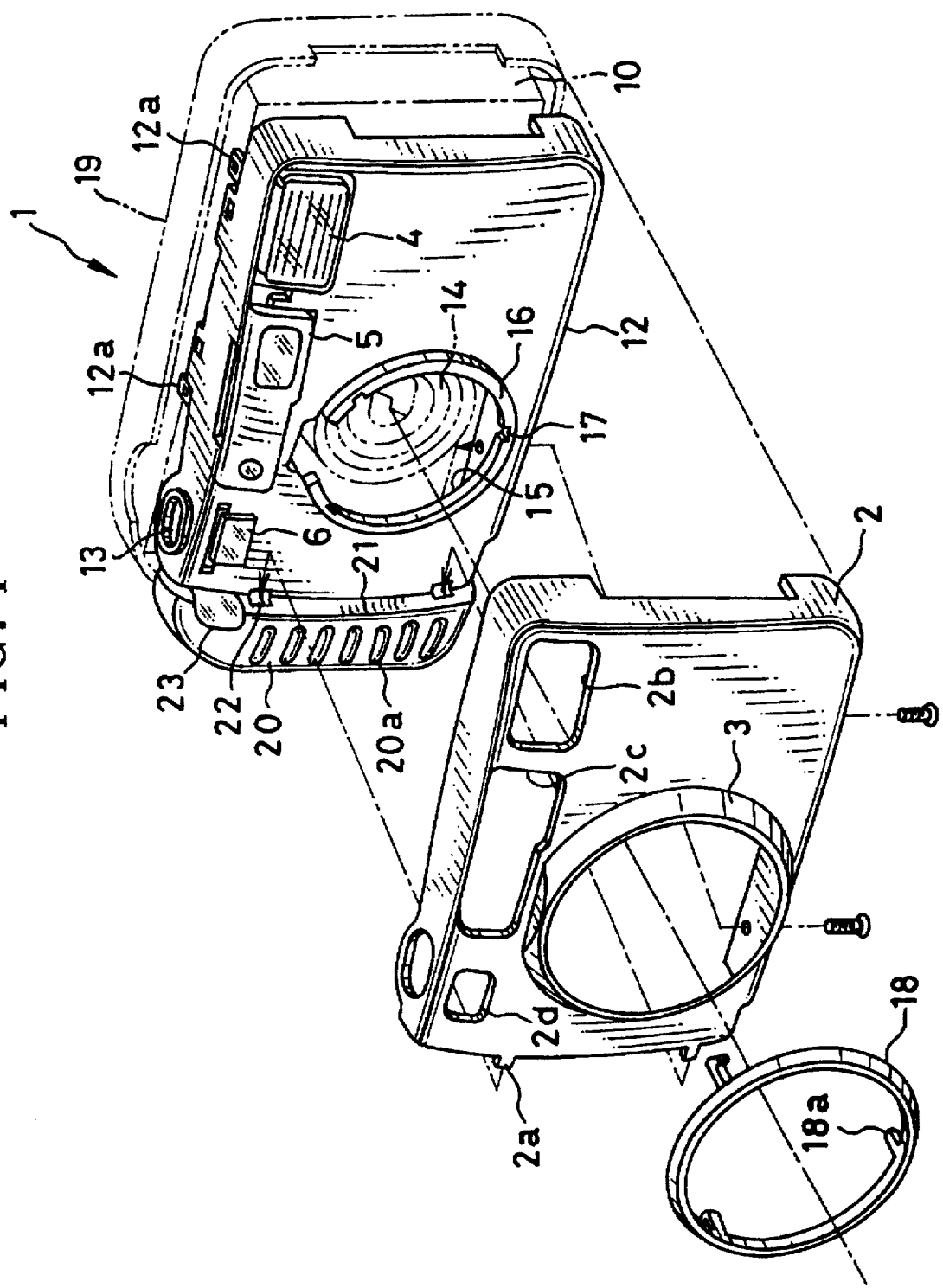
FIG. 1 is an exploded perspective view illustrating a camera in accordance with the present invention.

A camera 1 according to the embodiment of the present invention is constituted of a front cover 2, an inner cover 12, a main body 10 and a rear cover 19, as shown in FIG. 1. The front cover 2 is made of metal plate, for example, an aluminum alloy plate by press working (drawing) so as to contour a front surface of the inner cover 12. A barrel cover 3 is integrally formed with the front cover 2 by raising a periphery of an opening formed in the center of the front cover 2. The front cover 2 further has openings 2b, 2c and 2d into which a diffusion plate 4, a viewfinder cover 5 and a photometry window cover 6 for automatic focusing are fitted respectively. The diffusion plate 4 is mounted on the inner cover for diffusing flash light.

As shown in FIG. 1, the front cover 2 covers the main body 10 which incorporates a shutter mechanism, film advancing mechanism and so force. The inner cover 12 is disposed between the front cover 2 and the main body 10. The inner cover 12 is made of plastics as a single piece. The front surface of the inner cover 12 has a shape similar to an inner surface of the front cover 2. The diffusion plate 4, the viewfinder cover 5 and the photometry window cover 6 are mounted on the inner cover 12.

Figure 2:
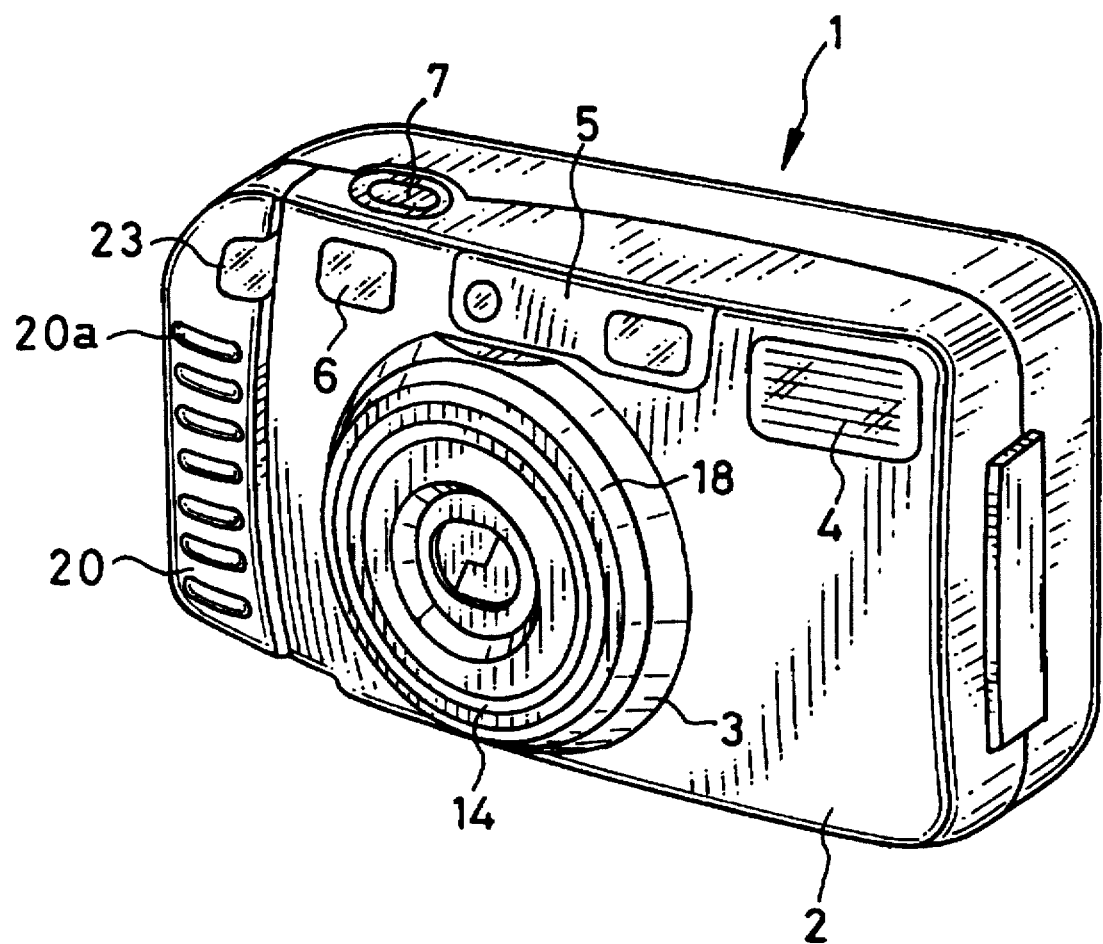
FIG. 2 is a perspective view illustrating the camera as assembled.

The inner cover 12 is provided with a grip portion 20 integrally molded with the inner cover 12. As shown in FIG. 2, when the front cover 2 is secured to the inner cover 12, the grip portion 20 is exposed to the outside from the side of the front cover 2 so as to protrude from the front cover 2. The grip portion 20 has an appropriate number of ridges 20a formed integrally therewith for improving reliability of gripping. Since the inner cover 12 and the grip portion 20 are formed as a one-piece plastic molding, the cost for producing such the grip portion 20 does not become so high, in comparison with a case in which such a grip portion is formed with a front cover.

A pair of hollows 22 are formed in a step wall 21, which is raised from the front surface of the inner cover 12 to the grip portion 20, to receive a pair of projections 2a which project from the side of the front cover 2, as shown in FIG. 1, so that the front cover 2 may not be moved in the vertical direction and lifted up relative to the inner cover 12.

Photographic elements such as a shutter mechanism and a film transporting mechanism are incorporated in the main body 10. The main body 10 also contains electric circuit elements and a flexible printed circuit board to connect these circuit elements. The inner cover 12 serves as an insulation to prevent the electric circuit elements and the flexible printed circuit board from contacting the metallic front cover 2 which has electric conductivity.

To secure the front cover 2, machine screws are usually utilized. However, such engagement with the screws is not suitable in appearance. In view of this problem, the inner cover 12 has connecting projections 12a which engage with the main body 10 and the rear cover 19. Even when only two machine screws are screwed from the bottom of the front cover 2 to the main body 10, as shown in FIG. 1, the firmness between the front cover 2 and the main body 10 may be sufficient.

When the front cover 2, the inner cover 12 and the main body 10 are fitted as one body, a flash tube, a viewfinder objective lens, photometric light projector and receiver for automatic focusing, which are mounted in the main body 10, are positioned behind the diffusion plate 4, the viewfinder cover 5, and the photometry window cover 6. The shutter release button 7 projecting from the main body 10 is exposed to the outside in an opening formed in the top of the front cover 2 through an opening 13 of the inner cover 12. Incidentally, the opening of the front cover 2 is formed at a position corresponding to the opening 13. Note that a reference numeral 23 represents a self timer indicator for indication of drive of an LED incorporated in the main body 10.

Figure 3:
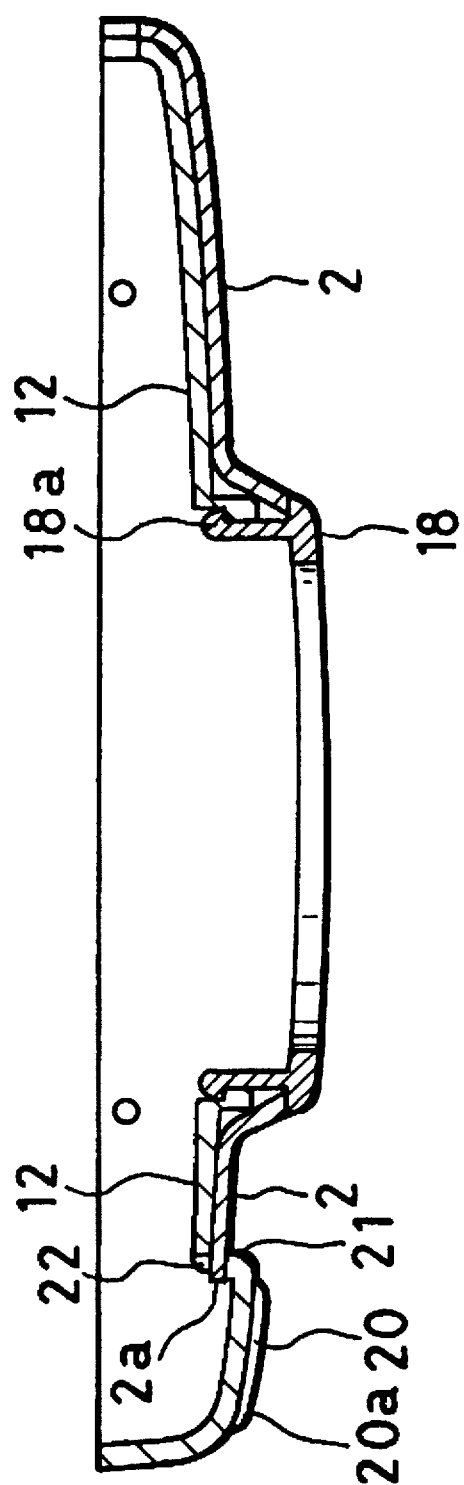
FIG. 3 is a sectional view illustrating principal portions of a front cover and an inner cover.

A lens barrel 14 is free to project and retract through an opening 15. The opening 15 is surrounded by a rim 16 raised toward the outside. Three recesses 17 are formed at appropriate intervals inside the rim 16 to be engaged with three hooks 18a of an ornamental ring 18. As shown in FIG. 3, when the hooks 18a are entirely inserted into the opening 15 along the recesses 17, the ornamental ring 18 is firmly fitted on an edge of the barrel cover 3 and covers the edge. Therefore, special finishing, for example, finishing by diamond cutting is not necessary for the edge of the barrel cover 3, moreover the appearance of the lens barrel cover 3 may be fine.

The steps of mounting the front cover 2 to the inner cover 12 are described below. As shown in FIG. 1, the projections 2a provided on the one side of the front cover 2 are inserted into the hollows 22 formed in the step wall 21 of the inner cover 12, respectively. In the course of fitting the front cover 2 on the inner cover 12, the rim 16 of the inner cover 12 contacts the inner surface of the lens barrel cover 3, and finally the other side of the front cover 2 is fitted with the side of the inner cover 12 opposite to the grip portion 20. The front cover 2 and the inner cover 12 are thus secured as one body while the grip portion 20 protrudes to the outside from the one side of the front cover 2, as shown in FIG. 2. The ornamental ring 18 is fitted on the edge of the barrel cover 3 from the front of the front cover 2. The hooks 18a are inserted in the opening 15 along the recesses 17 respectively and the hooks 18a engage with the inner cover 12, so that the front cover 2 is secured with the inner cover 12.

Then the inner cover 12 covered with the front cover 2 is mounted to the front of the main body 10. Thanks to the connecting projections 12a, the inner cover 12 may be firmly fitted to the main body 10 and the rear cover 19 accurately in position. Then machine screws are screwed in the rear cover 19 from the back thereof or in the main body 10 from the side thereof. Further the other machine screws are screwed from the bottom of the front cover 2. The front cover 2 and the inner cover 12 are thus tightly secured with the main body 10 and the mounting operation is completed.

As shown in FIG. 2, the grip portion 20 of the completed camera 1 is exposed to the outside at the one side of the front cover 2 and protrudes forwardly from the front cover 2. When a user takes a posture for photography, the user holds the protruding grip portion 20 with a right hand. Since there is no necessity of providing an anti-slipping finish to the front cover 2, such as a projection or an uneven surface, for stably gripping, the press forming process of the front cover 2 can be performed simply. Also, it is unnecessary to provide the front cover 2 with any separated parts such as a rubber piece. Accordingly, the number of parts and the number of operational steps are never increased so that the cost for producing the camera 1 is prevented from being increased. It is possible that the grip portion 20 of the plastic adapts to varied design patterns, according to combinations of coating pattern and molding pattern.

Figure 4:
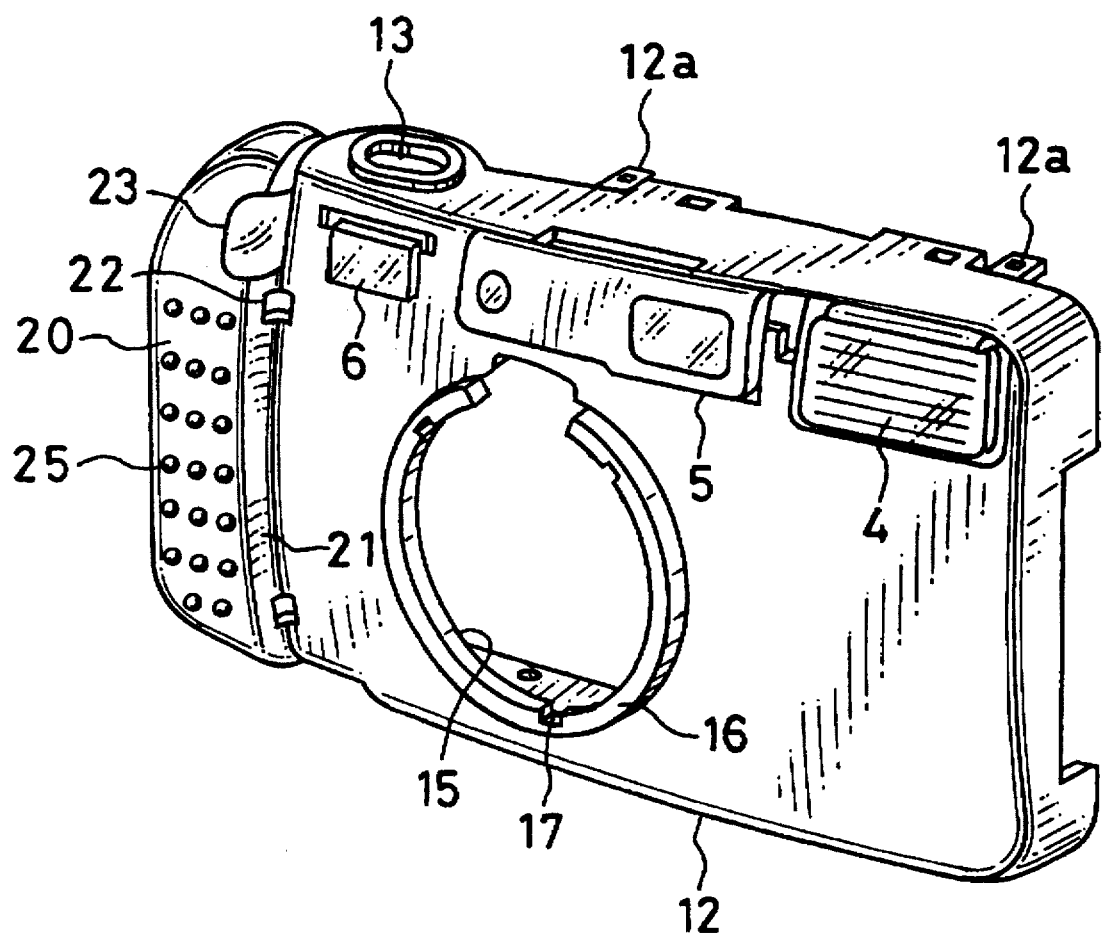
FIG. 4 is a perspective view illustrating another embodiment.

It is to be noted that plural recesses may be substituted for the plural ridges 20a. In this case, reference numeral 20a in FIGS. 1 and 2 denotes the recess. Further, as shown in FIG. 4, small concave or convex dots 25 may be formed on the surface of the grip portion 20 instead of the ridges or the recesses 20a. It is possible to make the surface of the grip portion 20 to be rough. It is also possible to make the shape of the grip portion 20 to be easy to grip.

Thickness of a grip portion in an optical axis direction may be similar to thickness of a front cover. Moreover, whole front surface of an inner cover including a grip portion may be same surface, in this case, the grip portion dose not project in a front direction beyond the front cover.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be constructed as included therein.

What is claimed is:

1. A camera having a main body and a metallic front cover which is mounted in front of said main body, said camera comprising:

an inner cover which is made of plastic and disposed between said front cover and said main body; and a grip portion provided on said inner cover and disposed at a position which is not covered with said front cover.

2. A camera as defined in claim 1, wherein said grip portion projects in a front direction beyond said front cover.

3. A camera as defined in claim 2, wherein said grip portion has a surface on which an anti-slipping finish is given for reliably gripping.

4. A camera as defined in claim 3, wherein a plurality of ridges are formed by said anti-slipping finish.

5. A camera as defined in claim 3, wherein a plurality of recesses are formed by said anti-slipping finish.

6. A camera as defined in claim 3, wherein a plurality of convex dots are formed by said anti-slipping finish.

7. A camera as defined in claim 3, wherein a plurality of concave dots are formed by said anti-slipping finish.

8. A camera as defined in claim 2, wherein said front cover is provided with a first opening, a second opening and a barrel cover, a diffusion plate provided on said inner cover for diffusing flash light being fitted into said first opening, a viewfinder cover provided on said inner cover being fitted into said second opening, and said barrel cover being cylindrical and containing a lens barrel which is provided on said main body.

\* \* \* \* \*